United States Patent [19]
Krist

[11] Patent Number: 5,586,449
[45] Date of Patent: *Dec. 24, 1996

[54] HYDRONIC INTERFACE SYSTEM, METHOD AND APPARATUS

[76] Inventor: Gene Krist, c/o BRDG-TNDR Corporation 2550 NW. Fourth Ct., Ft. Lauderdale, Fla. 33311

[ * ] Notice: The term of this patent shall not extend beyond the expiration date of Pat. No. 5,347,825.

[21] Appl. No.: 309,090

[22] Filed: Sep. 20, 1994

Related U.S. Application Data

[63] Continuation-in-part of Ser. No. 87,425, Jul. 2, 1993, Pat. No. 5,347,825.
[51] Int. Cl.$^6$ .............................. G05D 23/00; F24D 3/00
[52] U.S. Cl. .............................. 62/179; 165/288; 237/8 R
[58] Field of Search .................... 62/179, 201; 237/8 R; 165/37

[56] References Cited

U.S. PATENT DOCUMENTS 5,347,825  9/1994  Krist ............................................ 165/37

Primary Examiner—William E. Wayner

[57] ABSTRACT

A method and apparatus for coupling a primary loop with a secondary loop for circulating processing fluids therebetween comprising in combination: a first connection for the feed line of the primary loop and a second connection for the return line of the primary loop; a third connection for the feed line of the secondary loop and a fourth connection for the return line of the secondary loop; a crossover line coupling the four connections; first valve means for controlling the flow through the secondary loop; first sensor means responsive to the temperature associated with the secondary loop to control the first valve means; second valve means in the path of flow through the crossover line; and second sensor means responsive to the flow of the process fluid across the crossover line to control the second valve means.

3 Claims, 6 Drawing Sheets

HYDRONIC INTERFACE SYSTEM, METHOD AND APPARATUS

RELATED APPLICATIONS

This is a continuation-in-part of U.S. patent application Ser. No. 08/087,425, filed Jul. 2, 1993 now U.S. Pat. No. 5,347,825.

BACKGROUND OF THE INVENTION

1. Field of the Invention

This invention relates to a hydronic interface system, method and apparatus and, more particularly, to a system for feeding process fluid in a controlled manner through a primary loop and associated secondary loops, each secondary loop having an associated first valve controlled by the temperature associated with its associated secondary loop to vary the flow through the primary loop, and each secondary loop also having a crossover line with a second valve controlled by the pressure or flow across the crossover line.

2. Description of the Background Art

In the field of flow control systems, one technique for providing chilled process water to a plurality of remote sites is to use a primary flow loop from chillers to the sites where the water is to be utilized, as for air cooling, and then back to the chillers for recycling in a continuous cycle of operation. At the remote sites where the process water is to be used, secondary pumped flow loops tap from, and return to, the primary loop, the chilled water for use in air cooling at each of the various sites. As a result, there is one primary loop in a continuous flow and a plurality of pumped secondary loops for utilizing the water from the primary loop as needed.

In considering any one secondary loop, there will be a section of crossover line which is common with both the primary loop and the secondary loop. The apparatus coupling the primary loop with a secondary loop is a water bridge. A primary pump is used to continuously feed the water through the primary loop. A secondary pump is used to feed the water through each secondary loop but only at a given rate and only when required. Without appropriate controls, however, the system would be very inefficient, chilling and/or feeding more or less water than is needed for the intended air cooling.

In U.S. Pat. No. 3,729,051, the problem of controlling the quantity of flowing water was addressed and solved. According to that patent, a small supplemental water line is placed across the common extent of the primary and each secondary loop. The supplemental line at each secondary loop was of a significantly smaller diameter for a limited flow, merely sufficient to sense a primary flow balance between the primary loop and the flow of the secondary loop.

For optimum efficiency, the flow through the primary loop should equal the flow required to supply the primary flow needs to the total of secondary loops. If insufficient water is pumped in either loop, the intended cooling will not be effected. If excess water is pumped, unnecessary energy will be expended in moving the water. By sensing the flow along the supplemental line, verification may be made that water is flowing and that pressure exists in a supplemental line. So long as the sensed water in the supplemental line remains at the optimum predetermined flow, no change is made to the fluid flow. If, however, the sensed water varies from the predetermined flow, a signal is sent back to a first control valve in the primary loop to restrict the flow and thereby minimize the work done by the pump of the primary loop. This effects a greater efficiency.

In a subsequent improvement, as described in U.S. Pat. No. 3,875,995, temperature is also taken into account for controlling water flow. In the event that the supply or return water in the secondary loop varies from its intended, predetermined temperature, inefficiency results. If the temperature of the water in the secondary loop is not cool enough, the intended air cooling will not be effected. If the temperature of the water in the secondary loop is too cool, excess chilling is being done at an unnecessary cost to the system and its user. As a result, a temperature control sensor is provided. So long as the sensed temperature is at a predetermined value, the chilling simply continues. If, however, the temperature deviates from the predetermined value, the difference is sensed and a signal is sent to a second control valve located in the crossover line of the water bridge to vary the quantity of chilled water provided to the secondary loop to temperature demand of the loop. This feature further increases the efficiency of the system by reducing the primary water to a minimum.

One additional technique for controlling the flow of process fluids from a primary loop to secondary loops involves controlling the flow as a function of sensed temperature. In no such system, however, is there an associated control of process fluid through a crossover line or an associated sensing of flow or pressure.

The background art discloses systems for controlling the flow of process fluids. Nothing in the prior art, however, controls the flow with the simplicity, accuracy and efficiency afforded by the present invention.

Based upon field observations of the shortcomings of prior installations, the valve controllers are now set up so that a measured temperature controls the main flow return valve (V-1) and a measured pressure differential controls the crossover recirculation valve (V-2). Having the valves set up in this fashion allows for a most efficient operation of the system in all areas independent of the distance from the central plant. The valves will now operate inversely to each other, as they should, in that the main flow return valve (V-1) closes and the crossover recirculation valve (V-2) opens in proportion thereto. With the valve controls set up in this fashion, a 100% success rate has been achieved in all applications.

Therefore, it is an object of this invention to provide a method and apparatus which is a significant contribution to the advancement of the arts.

It is a further object of the present invention to control the flow of process fluids through a secondary loop as a function of the temperature at the secondary loop in association with the control of fluids through a crossover line as a function of the flow through the crossover line.

It is a further object of the present invention to control the flow of process fluids from a primary loop to a plurality of secondary loops as a function of the temperature at the secondary loop.

It is a further object of the present invention to control the flow of recirculating process fluids through a secondary loop as a function of the flow through the crossover line.

It is a further object of the present invention to employ a primary loop and associated secondary loops, each secondary loop having a common control with a first component coupling a temperature sensor and valve to vary the flow through the primary loop, a second component coupling a flow sensor and valve to vary the flow of recirculating process fluid across a crossover line and thereby vary the operation of the valves as a function of the specific application of the system.

Lastly, it is an object of the present invention to provide an improved apparatus and method of controlling the temperature at a plurality of sites to be controlled comprising the steps of: providing a process fluid generator subassembly; providing a plurality of temperature controlling subassemblies; providing a primary loop and a plurality of associated secondary loops extending through the temperature controlling subassemblies; feeding a flow of process fluid in the primary loop and secondary loops extending between the process fluid generator subassembly and the plurality of air temperature controlling subassemblies; providing a plurality of fluid bridges, each coupling the primary loop with a secondary loop, each bridge having feed and return connections coupled to the feed and return lines of the primary loop and feed and return connections coupling feed and return lines of a secondary loop, and a crossover line coupling the primary and secondary loops; sensing the flow in each water bridge crossover line; varying a valve in the path of flow through each crossover line in response to the sensed flow; sensing the temperature associated with each secondary loop; and varying a temperature responsive valve in response to the sensed temperature to vary the flow through the primary loop.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing the invention, the invention may be incorporated into an apparatus for coupling a primary loop with a secondary loop for circulating processing fluids therebetween comprising in combination: a first connection for the feed line of the primary loop and a second connection for the return line of the primary loop; a third connection for the feed line of the secondary loop and a fourth connection for the return line of the secondary loop; a crossover line coupling the four connections; first valve means for controlling the flow through the primary loop; first sensor means responsive to the temperature associated with the secondary loop to control the first valve means; second valve means in the path of flow through the crossover line; and second sensor means responsive to the flow of the process fluid across the crossover line to control the second valve means.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiments may be readily utilized as a basis for modifying or designing other methods and structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference numerals refer to similar parts throughout the various drawings.

DETAILED DESCRIPTION OF THE INVENTION

Overview

Figure 1:
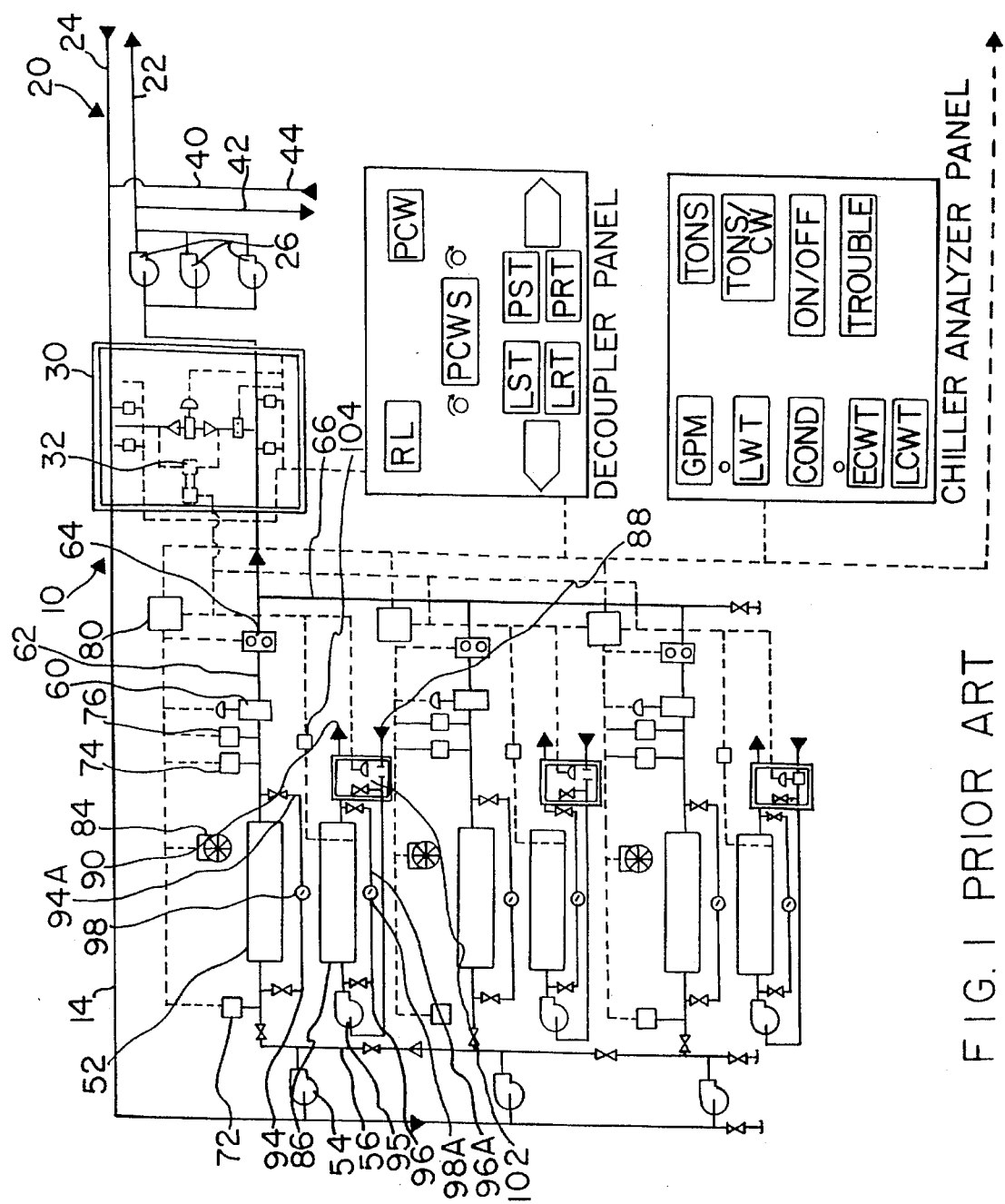
FIG. 1 and FIG. 1A together constitute a schematic illustration of a fluid control system constructed in accordance with the principles of the present invention, the water chiller subsystem being shown in FIG. 1 and the air cooler subsystem being shown in FIG. 1A.
Figure 1A:
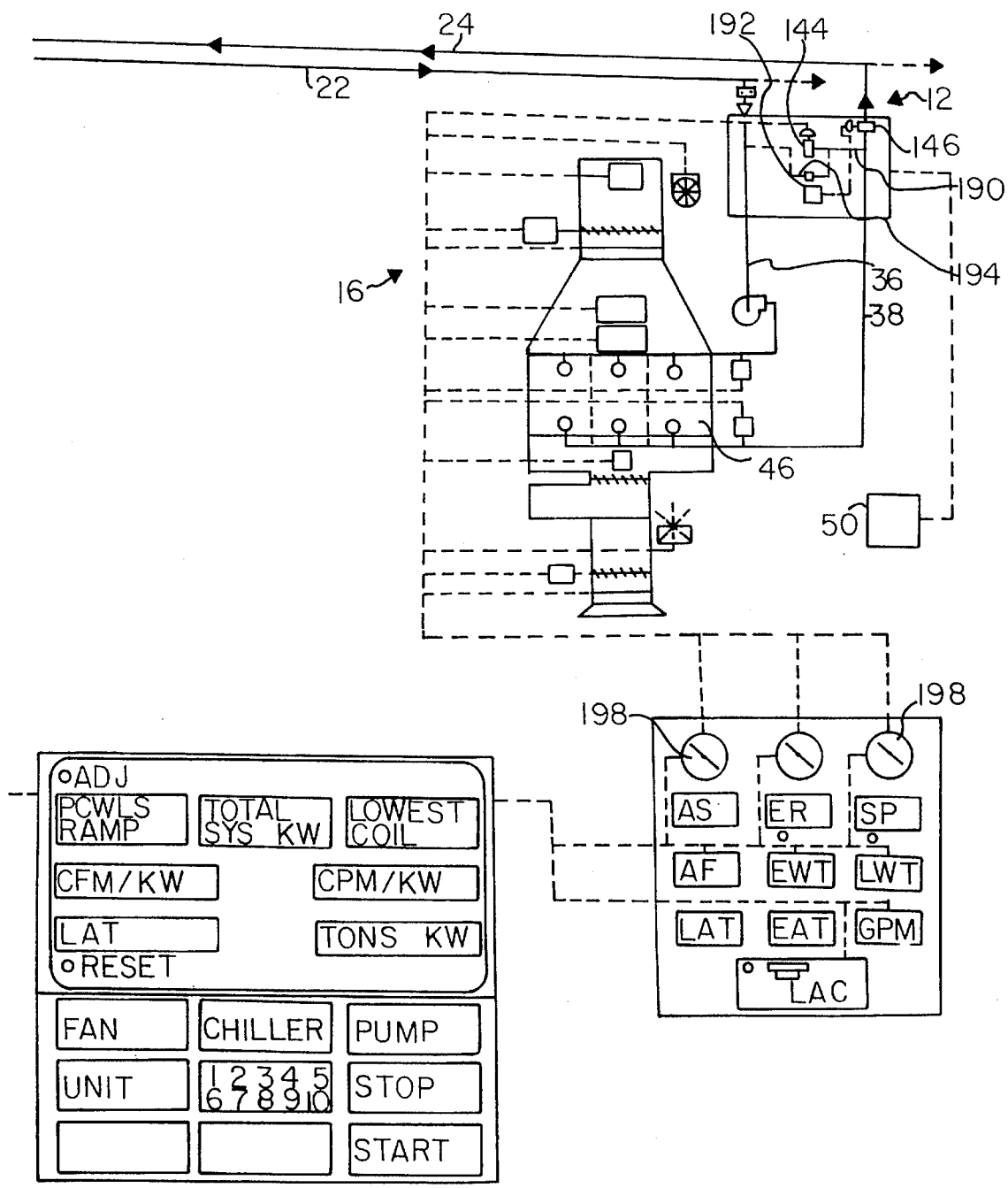

FIGS. 1 and 1A, when taken together, represent a schematic overview of a system 10 employing the water bridge 12 and control elements of the present invention. The FIG. 1 components are generally directed to the subsystem 14 for chilling the process fluid such as water to be utilized. FIG. 1A illustrates the components of the subsystem 16 wherein the chilled water is utilized as for air cooling purposes. The two subsystems are coupled by a common primary loop 20 including feed and return lines 22, 24. Also coupling the two subsystems are auxiliary feed water booster pumps 26 along with a fluid flow decoupler assembly 30 in advance of the booster pumps.

Figure 2:
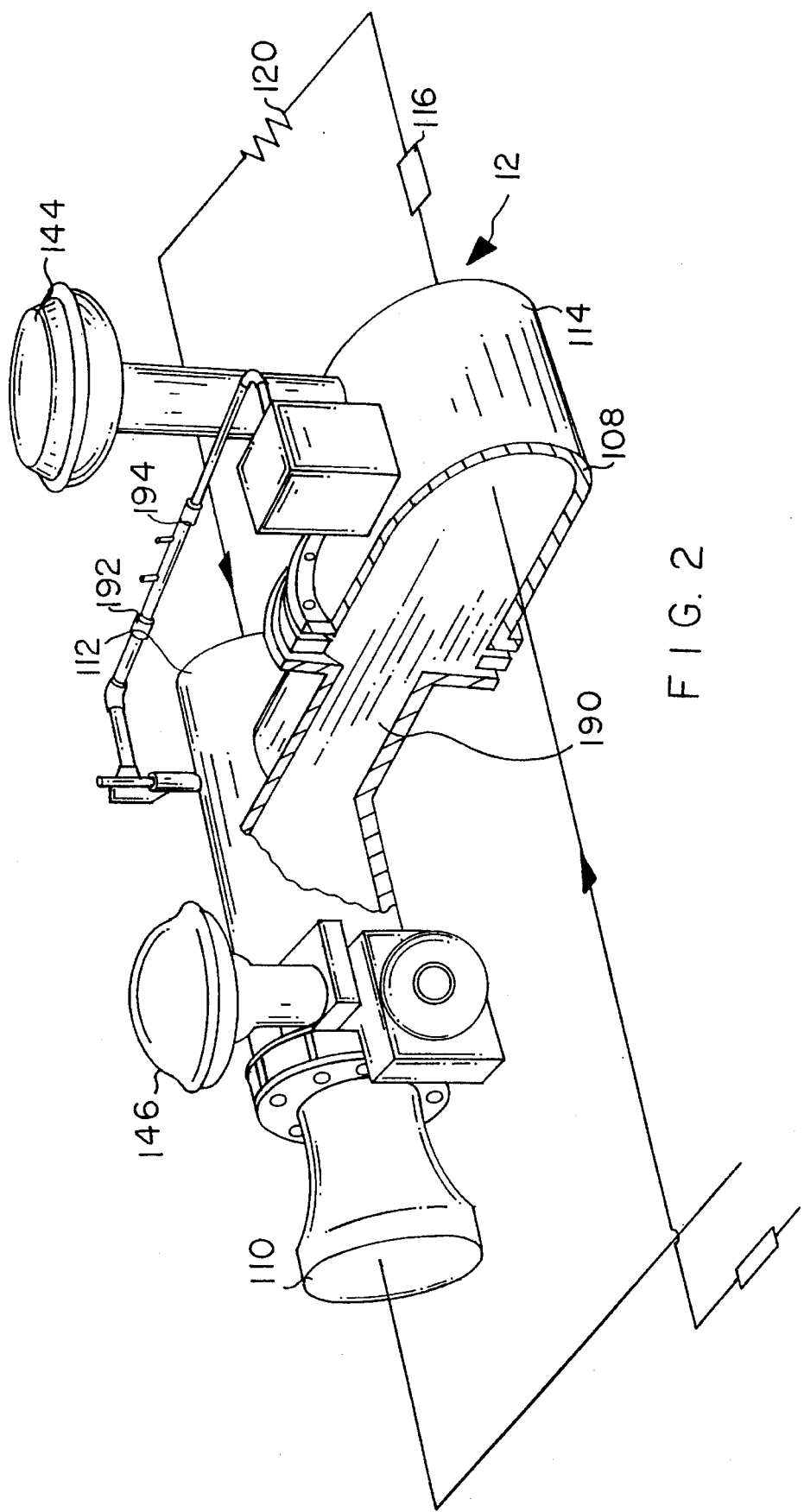
FIG. 2 is a perspective illustration of the water bridge which is shown schematically in the upper right-hand corner of FIG. 1A.

FIG. 1A shows the components for utilizing the chilled process water and includes a water bridge 12 coupling the lines of the primary loop 20 with the feed and return lines 36, 38 of one illustrative secondary loop 40. The water bridge 12 is more specifically described hereinafter and can be seen in the mechanical perspective illustration of FIG. 2. FIG. 1 also illustrates supplemental lines 42, 44 of the primary loop 20 for conveying the process water to sites other than the shown site 46 whereat it may be tapped through any number of additional water bridges for secondary loops for utilization at such additional sites other than that as shown in FIG. 1A.

Also shown in FIG. 1, as well as FIG. 1A, are a plurality of panels for monitoring and controlling the operation of the system 10. These panels include the decoupler panel, the chiller analyzer panel, the air flow control panel, the system analyzer panel, and the host computer 50.

Water Chiller Subsystem

The FIG. 1 showing illustrates in detail a typical chiller subsystem 14. Any number of individual chillers 52 might be used in the chiller subsystem. FIG. 1 illustrates three chillers, each with its own accompanying support elements. It should be understood, however, that one or any number might be used in parallel similar to the way the three such chillers are illustrated. For the sake of convenience only one chiller and its associated support elements will be described herein.

The chiller 52 has an input end to receive recirculating process water from the return line 24 of the primary loop 20. A chiller pump 54 taps a preselected quantity of process water from the return line and feeds it to an intermediate input line 56 coupling the inputs of the various chillers of the subsystem. A line extends through the chiller to its output end and constitutes a separate chiller loop at the starting point of the primary loop. A flow control valve 60 is positioned in the output line 62 of the chiller. The control valve flow is followed by a flow transducer 64, a flow meter and transmitter, prior to coupling in the output of the other chillers through an output mixing line 66. Thereafter the chiller output is fed through the water bridge 32 of the decoupler assembly 30 followed by the transport or booster pumps 26. Temperature sensors 72, 74, 76 are located to determine the chiller entering water temperature as well as the chiller leaving water temperature and feed such information to the controller 80. The output of a flow transducer 64 is also fed to the controller 80. The controller 80 acts to vary the flow control valve 60 in order to maintain the flow rate at a proper level for the intended function. The output of the controller is also fed to the chiller analyzer panel as well as the system analyzer panel for monitoring and controlling the performance of the system overall.

Operating in association with each chiller 52 is an associated condenser 86. The condenser 86 receives and disseminates water to and from a tower, not shown, through feed and return lines 88, 90, the force being provided by a condenser pump 95. A compressor 84 thermally couples the chiller and condenser. Pressure transfer lines 96, 96a from the input and output of the condenser 86 feed a flow indicating switch 98a. A condenser valve 102, in the nature of that in the water bridge, is coupled between the tower and the condenser for monitoring and controlling the temperature or flow of the water through the condenser. A pressure transmitter controller 104 is located between the condenser and flow controller to sense the pressure in the condenser and to feed its output to the flow controller for control of the condenser valve.

The foregoing sets forth the elements by which the process water of the system is chilled, monitored, and controlled for providing water to the transport primary loop 20 for use by the secondary loop 40.

Primary Loop/Secondary Loops

Figure 3:
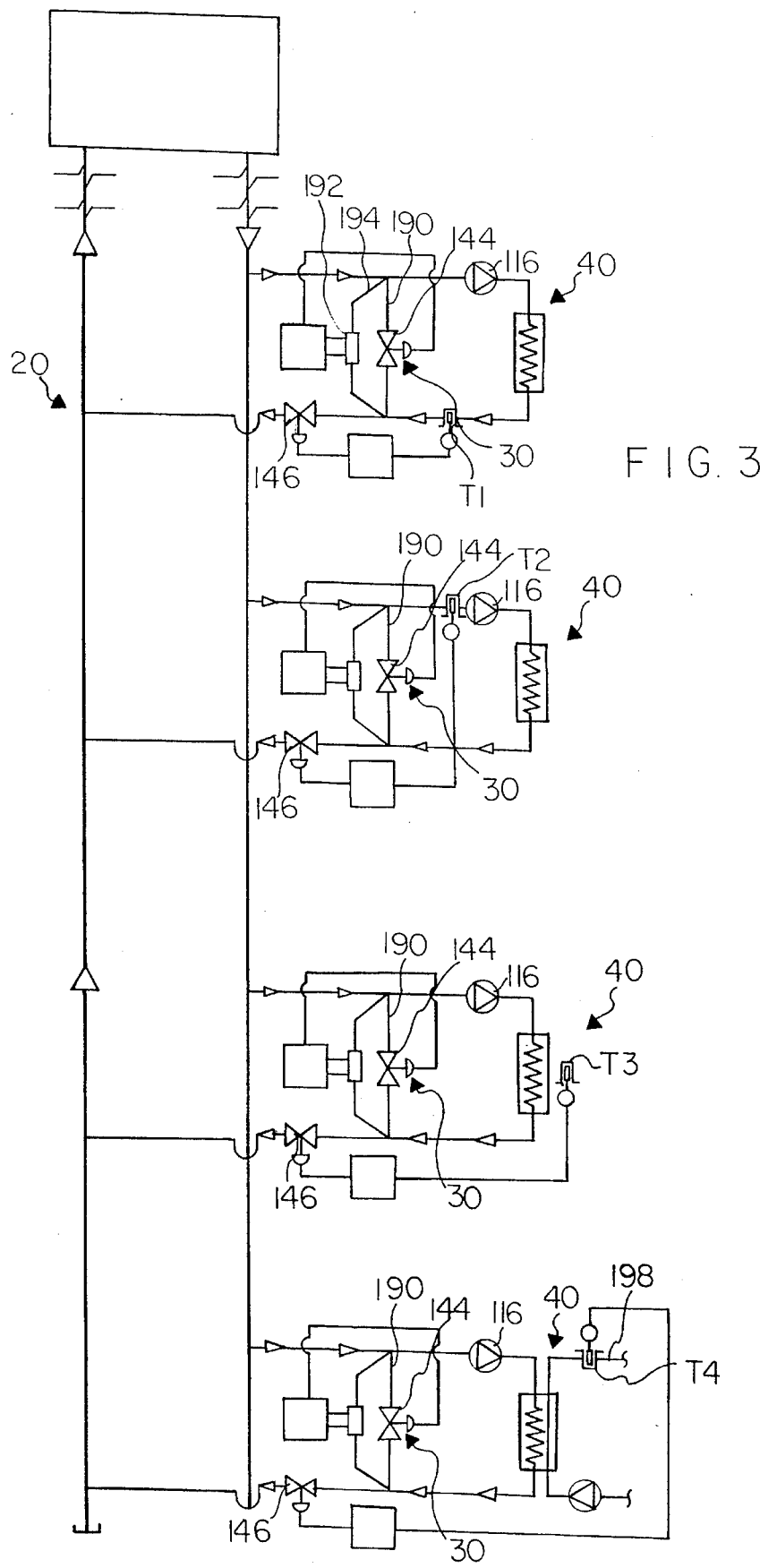
FIG. 3 is a schematic illustration showing an overall system having a primary loop and secondary loops controlled in a systems configuration.
Figure 4:
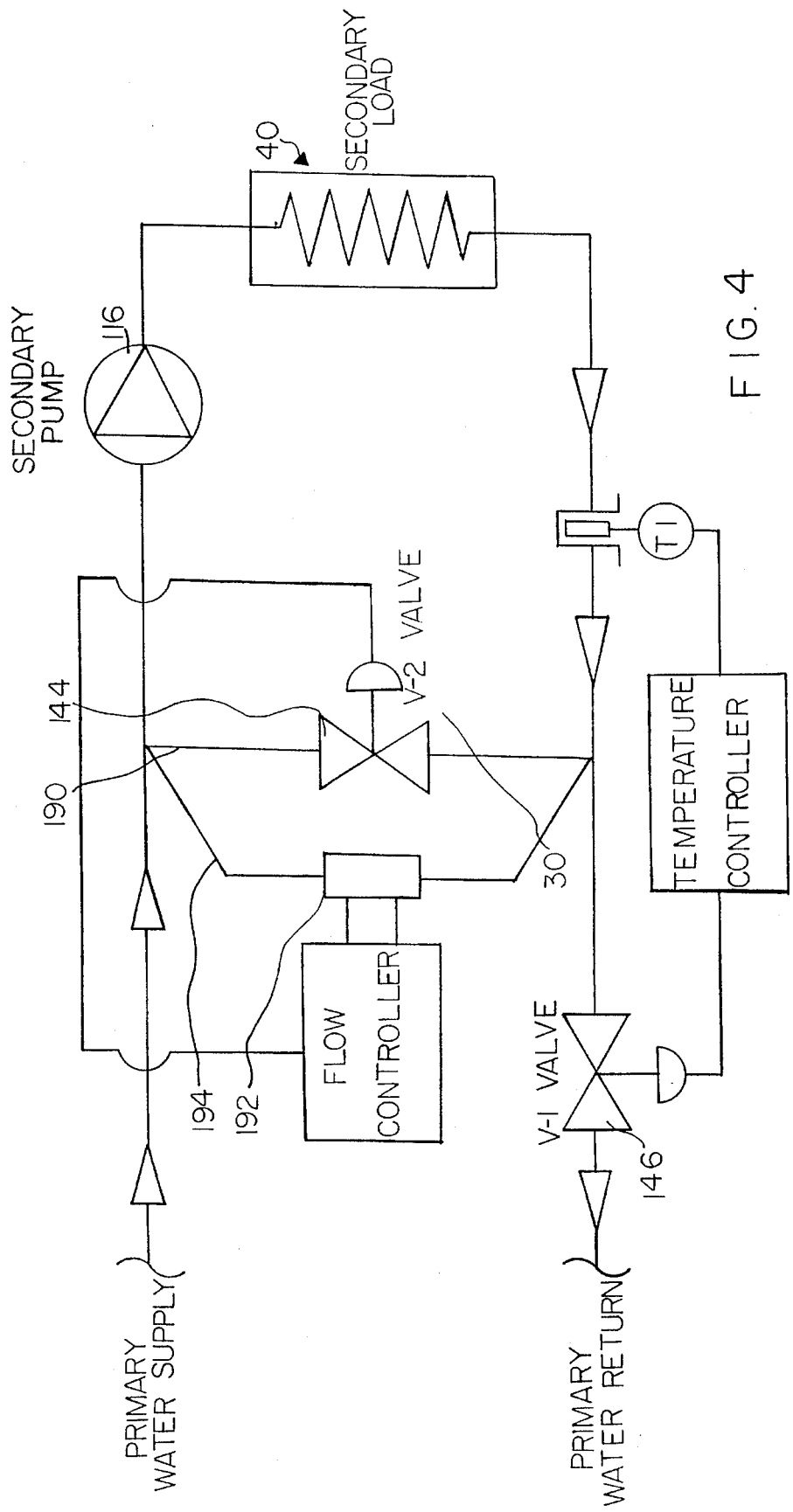
FIG. 4 is a schematic illustration of one secondary loop.

As can be best understood by reference to FIG. 3, the bridge for fluid, preferably water, is a device positionable to couple the feed and return lines of the primary transport loop 20 with the input return lines of each of a plurality of secondary loops 40. A common crossover line 190 couples these two loops. A primary pump feeds the process water through the primary transport loop. A secondary pump 116 feeds the process fluid through the secondary loop as needed. In those conditions when it is not desired for the secondary loop to function for its air cooling purposes, the secondary pump is inactivated. This causes valve 144 to close in the crossover line 190. Because the cooling pump is shut down, valve 146 senses no demand for cooling and closes. This response stops unnecessary bypass flow through the secondary loop when not required. When, however, it is desirous to utilize the secondary loop for its cooling function, the secondary pump 116 is activated so that a flow of process fluid is created to the secondary loop. The first or temperature responsive valve 146 (V-1) is located in the water bridge adjacent the return line of the primary loop. This temperature valve is available to control the total flow of fluid through the primary loop to meet the demand needs of the secondary loop.

The temperature valve 146 is opened or closed to any extent as a function of the temperature in the secondary loop. This valve is controlled through the controller with its temperature sensor, either T-1, T-2, T-3 or T-4, located at any one of a plurality of predetermined points such as temperature sensor T-4. Note FIG. 3. Temperature sensor T-4 is in the path of flow of fluid in line to be controlled by the load 40 of the secondary loop. Control is effected by the fluid of line 198 passing in heat exchange relationship with the line of the secondary loop at load 40. Other possible locations for the temperature sensors include temperature sensor T-3 located in the path of flow of air after begin passed through the load, temperature sensor T-2 located in a process fluid supply position of its secondary loop, or temperature sensor T-1 located in a process fluid return position of its secondary loop. So long as the temperature is within a predetermined range, the valve 146 will not vary. Once, however, its associated temperature sensor detects a change from the desired temperature, this information is fed to the controller for increasing or opening or for decreasing or closing the temperature responsive valve appropriately.

A second or flow responsive valve 144 (V-2) is located intermediate the ends of each supplemental crossover line 194. Like the first valve, the second valve is variable to proportionately restrict the flow of fluid, but through the crossover line. This is effected through a sensor 192 coupled with respect to the crossover line preferably in association with an additional smaller supplemental line 194 coupling the ends of the crossover line 190 in parallel therewith to effect a significantly lesser, but proportional, flow and pressure through the supplemental line 194 as compared with the larger flow through the crossover line. The detected pressure correlates directly to the fluid flow across the cross-over line which, through the controls located at the supplemental line, open or close the pressure valve proportionately for effecting the proper maintenance of the proper pressure relationship between the primary loop and each of the secondary loop.

As a result, the shortcomings of the previously employed systems, the present approach was developed. To overcome the problems in the open, uncontrolled bridge design, this present approach still uses two control valves with a temperature sensor and control loop and a flow or pressure sensor and control loop. However, the output of the temperature control loop is used to position the flow valve located in the distribution loop piping, and the output of the flow control loop is used to position the crossover valve located in the bridge. In this manner, superior control of the temperature control loop results, the desired pressure relationship from return to supply is maintained, and the interaction between the two loops is minimized.

Allowing temperature to control the flow of water into the user loop from the distribution loop allows a direct coupling of the cooling or heating source to the heating or cooling load. In order to achieve the desired hydraulic decoupling effect, it is simply a question of sizing the crossover bridge valve large enough so that at full flow, the pressure drop is small enough to prevent interaction between the two pumping loops. As the load in the user loop changes and flow across the bridge changes, the crossover valve is positioned to maintain the pressure setpoint, closing as the pressure reduces, and opening as the pressure increases. This new approach is also less vulnerable to flow variation within the user loop, because if the flow across the bridge rises above the design flow rate, the valve will be wide open, and if the flow drops off, the valve can be modulated towards the closed position, creating additional pressure drop.

The present invention is described with respect to controlling the flow and temperature of chilled water for use in cooling an air flow. It should be realized, however, that the present invention could be utilized for controlling the flow of other fluids, with the controlling being in response to other properties of the controlled fluid, and with the fluid being used for cooling, heating, or other functions.

Figure 5:
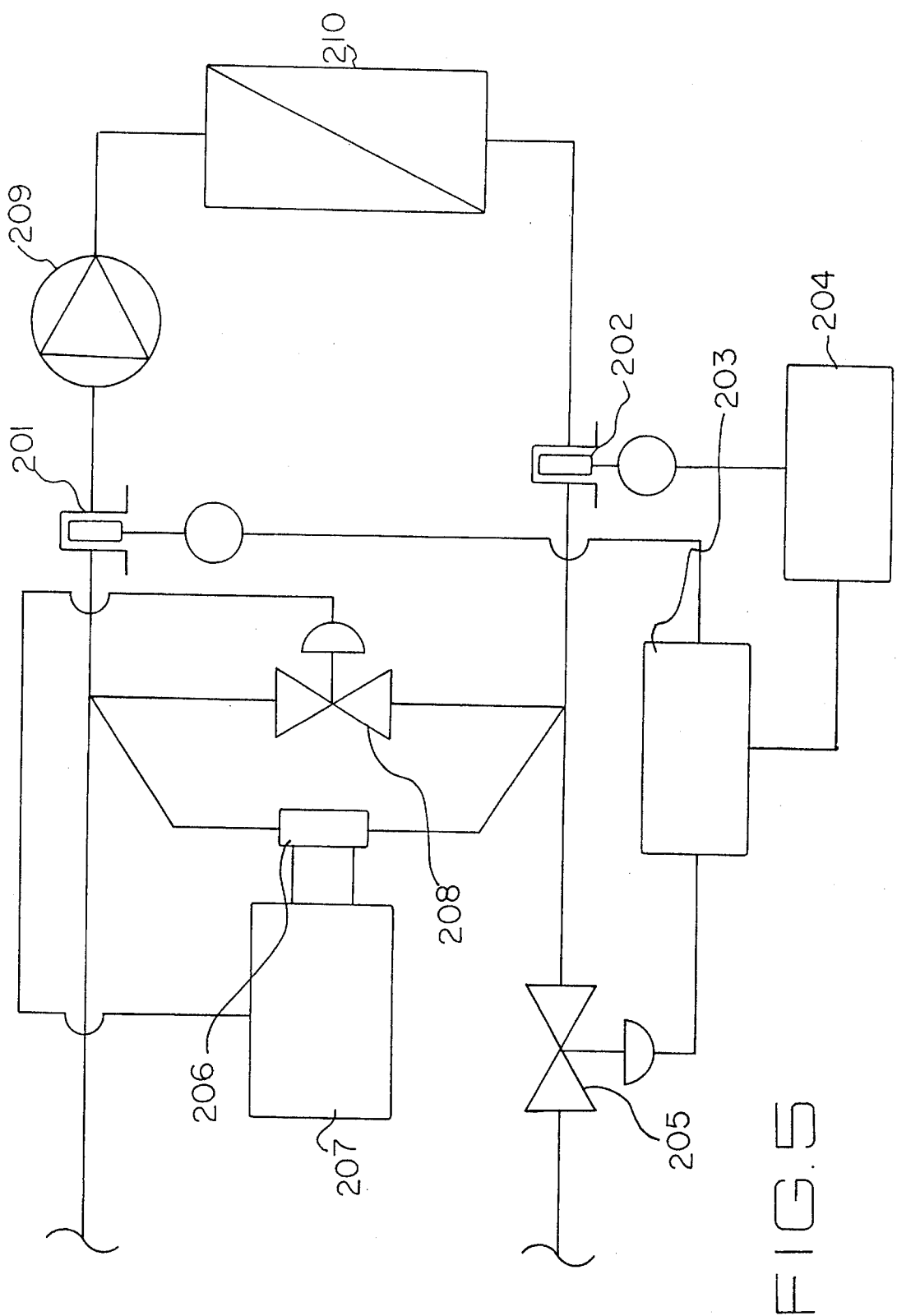
FIG. 5 is a schematic illustration of an alternate embodiment of the invention.

An alternate embodiment of the invention is seen in FIG. 5. Such embodiment applies to the return water control, leaving air control and leaving load control schemes for the prior embodiments. This embodiment is based on a return water control scheme, but the layout would be identical to the prior embodiments for leaving air and leaving load control except that the temperature sensor is located in the positions shown in FIG. 3. With this enhancement, the desired response from the temperature control loop is more easily obtained.

More specifically, as shown in FIG. 5, 201 is a supply water temperature sensor, 202 is a return water (leaving air or leaving water) temperature sensor, 203 is a temperature controller, 204 is a setpoint controller, 205 is a temperature responsive control valve, 206 is a flow sensor, 207 is a pressure controller, 208 is a pressure responsive control valve, 209 is a secondary pump and 210 is a heat exchanger, an air coil, water to water exchanger, or the like.

This alternate embodiment of the invention utilizes supply water control for all of the prior schemes, with the setpoint for the supply water being a dynamic value that is reset continuously through a separate control loop and setpoint controller 204 in FIG. 5. This enhancement provides improved temperature control because the effects of modulating the temperature responsive valve are seen very quickly at the supply water sensor whereas these effects may not be seen for a long time at the other sensor locations. This increased response time is due to the residence time of the heating or cooling medium in the piping loop and the heat transfer effects in the heat exchanger.

The present disclosure includes that contained in the appended claims as well as that of the foregoing description. Although this invention has been described in its preferred form with a certain degree of particularity, it is understood that the present disclosure of the preferred form has been made only by way of example, and that numerous changes in the details of construction and combination and arrangement of parts may be resorted to without departing from the spirit and scope of the invention.

Now that the invention has been described,

What is claimed is:

1. Apparatus for coupling a primary loop with a secondary loop for circulating processing fluids therebetween comprising in combination:

a first connection for the feed line of the primary loop and a second connection for the return line of the primary loop;

a third connection for the feed line of the secondary loop and a fourth connection for the return line of the secondary loop;

a crossover line coupling the four connections;

first valve means for controlling the flow through the primary loop;

first sensor means responsive to the temperature associated with the secondary loop to control the first valve means, the first sensor means including a supply temperature sensor and a return temperature sensor;

second valve means in the path of flow through the crossover line; and second sensor means responsive to the flow of the process fluid across the crossover line to control the second valve means.

2. A system for cooling a flow of air at a plurality of sites comprising:

a process fluid chiller subassembly;

a plurality of air cooling subassemblies;

a primary loop for process fluid extending between the process fluid subassembly and the plurality of air cooling subassemblies;

a plurality of secondary loops coupled to the primary loop for feeding process fluid from the primary loop to the air cooling subassemblies;

means to effect flows of air to be cooled across the secondary loops at the sites to be cooled;

a plurality of fluid bridges, each bridge coupling the primary loop with a secondary loop, each bridge having feed and return orifices coupled to the feed and return lines of the primary loop and feed and return connections coupling feed and return lines of a secondary loop, and a crossover line coupling the primary and secondary loops;

a temperature responsive valve in the path of flow of the process fluid to vary the amount of fluid flow through the primary loop and temperature sensors for supply fluid and return fluid at each secondary loop to determine the temperature at the secondary loop for controlling the temperature responsive valve; and a flow responsive valve in the crossover line for each fluid bridge and a flow sensor from each secondary loop responsive to the flow of the process fluid across the crossover line for controlling the flow responsive valve.

3. A method of controlling the temperature at a plurality of sites to be controlled comprising the steps of:

providing a process fluid generator subassembly;

providing a plurality of temperature controlling subassemblies;

providing a primary loop and a plurality of associated secondary loops extending through the air cooling subassemblies;

feeding a flow of process fluid in the primary loop and secondary loops extending between the process fluid generator subassembly and the plurality of temperature controlling subassemblies;

providing a plurality of fluid bridges, each coupling the primary loop with a secondary loop, each bridge having feed and return connections coupled to the feed and return lines of the primary loop and feed and return connections coupling feed and return lines of a secondary loop, and a crossover line coupling the primary and secondary loops;

sensing the flow in each water bridge crossover line;

varying a valve in the path of flow through each crossover line in response to the sensed flow;

sensing the supply and return temperatures associated with each secondary loop; and varying a temperature responsive valve in response to the sensed temperatures to vary the flow through the primary loop.

* * * * *